United States Patent [19]

Alberino et al.

[11] 4,321,333

[45] Mar. 23, 1982

[54] POLYURETHANE PREPARED FROM POLYISOCYANATE BLEND

[75] Inventors: Louis M. Alberino, Cheshire; Robert J. Lockwood, North Branford, both of Conn.

[73] Assignee: The Upjohn Company, Kalamazoo, Mich.

[21] Appl. No.: 254,920

[22] Filed: Apr. 16, 1981

[51] Int. Cl.³ .................... C08G 18/32; C08G 18/10
[52] U.S. Cl. .................... 521/159; 252/182; 260/453 AM; 260/453 AP; 528/61; 528/65; 528/66
[58] Field of Search .................... 521/159; 528/61, 65, 528/66; 252/182; 260/453 AM, 453 AP

[56] References Cited

U.S. PATENT DOCUMENTS

| | | | |
|---|---|---|---|
| 3,384,653 | 5/1968 | Erner et al. | 260/453 |
| 3,394,164 | 7/1968 | McClellan et al. | 260/453 |
| 3,394,165 | 7/1968 | McClellan et al. | 260/453 |
| 3,644,457 | 2/1972 | König et al. | 260/453 SP |
| 3,883,571 | 5/1975 | Allport et al. | 260/453 AM |
| 4,031,026 | 6/1977 | Ibbotson | 528/59 |
| 4,065,410 | 12/1977 | Schäefer et al. | 521/51 |
| 4,115,429 | 9/1978 | Reiff et al. | 260/453 SP |
| 4,118,411 | 10/1978 | Reiff et al. | 260/453 SP |
| 4,229,347 | 10/1980 | Holt et al. | 260/239 A |
| 4,239,857 | 12/1980 | Harper | 521/121 |

FOREIGN PATENT DOCUMENTS

| | | |
|---|---|---|
| 1369334 | 10/1974 | United Kingdom . |
| 1377676 | 12/1974 | United Kingdom . |
| 1430455 | 3/1976 | United Kingdom . |
| 1545003 | 4/1979 | United Kingdom . |
| 1577767 | 10/1980 | United Kingdom . |

*Primary Examiner*—Maurice J. Welsh
*Attorney, Agent, or Firm*—James S. Rose; Denis A. Firth

[57] ABSTRACT

Polyurethane polymers comprising the reaction product of an organic polyisocyanate (A), an organic polyol (B), & a difunctional extender (C) wherein the improvement comprises employing as the polyisocyanate (A) a composition comprising a bond of, (a) a prepolymer comprising the reaction product of methylenebis (phenyl isocyanate) with a polyol mixture comprising:
(1) polyol having a molecular weight of at least 1,000, &
(2) polyol having a molecular weight of about 115 to 300 & (b) a liquefied methylenebis (phenyl isocyanate). Also disclosed are blends of (a) & (b).

27 Claims, No Drawings

POLYURETHANE PREPARED FROM POLYISOCYANATE BLEND

BACKGROUND OF THE INVENTION

1. Field of the Invention

This invention relates to novel polyurethane polymers and is more particularly concerned with polyurethane polymers and their preparation from novel isocyanate prepolymer blends.

2. Description of the Prior Art

Polyurethane polymers and elastomers, prepared from high molecular weight polyols and organic polyisocyanates and extended with low molecular weight extenders, particularly diols and diamines, have been known and utilized for a long time.

In the course of the development of this art the use of liquefied isocyanate components has become of increasing importance with the advent of high pressure reactant mixing in the reaction injection molding (RIM) technique. In this connection, methylenebis(phenyl isocyanate), [MDI], which is solid at room temperature, has received the most attention because this isocyanate offers the optimum combination of good reactivity and yields products having good physical properties.

Typical of a non-urethane containing liquefied MDI product is the one made in accordance with U.S. Pat. No. 3,384,653 which is a liquid at ambient temperatures because of its content of uretoneimine. However, a much greater variety of liquefied MDI products have been disclosed which are in stable liquid form because a minor portion of the isocyanate groups has been reacted with active hydrogen containing components, particularly organic polyols. For example, see U.S. Pat. Nos. 3,394,164; 3,394,165; 3,644,457; 3,883,571; 4,115,429; 4,118,411; 4,229,347; and British Patents 1,369,334; 1,377,676; 1,430,455; 1,545,003; and 1,557,767.

Also disclosed in the prior art as liquefied MDI products are those derived from blends of both of the above types (U.S. Pat. No. 4,031,026).

One of the very important properties of molded polyurethanes is the green strength which they possess upon sample demold (which will be discussed in detail below). It has been already disclosed (U.S. Pat. No. 4,065,410) that a combination of liquefied MDI products with polyols and extender mixtures containing ethylene glycol and at least one other polyol having a molecular weight below 1800 and a blowing agent provide molded polyurethanes characterized by improved green strength. Further, the use of particular catalysts has been noted in U.S. Pat. No. 4,239,857 for enhancing green strength.

We have now discovered a novel class of blends comprising liquefied MDI products blended with liquid MDI prepolymers prepared from particular mixtures of high and low molecular weight polyols which blends when used in the preparation of molded polyurethanes give rise to an unexpected increase in sample green strength. The attainment of increased green strength does not detract from the other polymer physical properties, and, surprisingly, in some cases the polyurethanes have superior physical properties over prior art materials.

The improvement in sample green strength leads, additionally, to lower molding temperatures and molded parts having improved properties over prior art polyurethanes when compared in both the green state and cured state.

SUMMARY OF THE INVENTION

This invention comprises polyurethane polymers comprising the reaction products of an organic polyisocyanate (A), an organic polyol (B), and a difunctional extender (C) wherein the equivalent proportions of said polyol (B) to said extender (C) is within the range of about 1:4 to about 1:40 and the ratio of isocyanate equivalents of (A) to the total active hydrogen equivalents of said (B) and said (C) is from about 0.95 to about 1.10, wherein the improvement comprises employing as the polyisocyanate (A) a composition comprising a blend of, (a) from about 10 to about 50 percent by weight of a liquid isocyanate terminated prepolymer having an isocyanate equivalent weight of from about 150 to about 600 and comprising the reaction product of methylenebis(phenyl isocyanate) with a polyol mixture comprising:

(1) from about 15 to about 70 percent by weight of a polyol having a functionality of from about 2 to about 3 and a molecular weight of at least 1000; and (2) from about 85 to about 30 percent by weight of a polyol having a molecular weight falling within a range of from about 115 to about 300 selected from the group consisting of a diol, a triol, and mixtures thereof, wherein the total hydroxyl equivalents of said (1) and said (2) fall within a range of from about 0.10 to about 0.65 equivalent per equivalent of said methylenebis(phenyl isocyanate); and (b) from about 90 to about 50 percent by weight of a liquefied methylenebis(phenyl isocyanate), provided the proportions of said prepolymer (a) and said liquefied methylenebis(phenyl isocyanate) (b) while falling within the ranges set forth above are such that the isocyanate equivalent weight of said blend is from about 145 to about 200.

This invention also comprises the isocyanate compositions comprising blends of the liquid isycyanate terminated prepolymer (a) defined above and the liquefied methylenebis(phenyl isocyanate) (b) defined below in all proportions.

The term "liquid isocyanate" is used in the generally accepted sense known to those skilled in the art and means an isocyanate which is in the stable liquid state at room temperature (circa 20° C.).

The term "methylenebis(phenyl isocyanate)" (referred to hereinafter as MDI) means 4,4'-methylenebis(phenyl isocyanate) and mixtures of the 4,4'-isomer with up to about 10 percent by weight of the 2,4'-isomer.

The term "liquefied methylenebis(phenyl isocyanate)" means the various types of liquefied MDI products known to those skilled in the art. Included in this class are the storage stable products which are liquid at ambient temperature (circa 20° C.) and are obtained either by reacting said methylenebis(phenyl isocyanates) in varying proportions with minor amounts of one or more low molecular weight active hydrogen containing components (preferably less than 0.1 equivalent of active hydrogen per equivalent of isocyanate), particularly organic polyols; or else by converting a minor amount of the MDI into the carbodiimide-containing MDI or the uretoneimine adduct formed from said carbodiimide-containing material with MDI; see the patents cited supra relative to liquefied MDI products.

Advantageously, the isocyanate equivalent weight of the liquefied MDI's which can be used in the present blends fall within a range of from about 130 to about 225.

Preferred are the liquefied MDI products of the type comprising the carbodiimide-containing methylenebis(phenyl isocyanates) having an isocyanate equivalent weight of from about 130 to about 180 and, typically, those obtained from MDI with dipropylene glycol, tripropylene glycol, and mixtures thereof using less than 0.1 equivalent of said glycol per equivalent of MDI.

Particularly preferred as the liquefied MDI products are the carbodiimide-containing methylenebis(phenyl isocyanates) described above.

DETAILED DESCRIPTION OF THE INVENTION

The present invention, in one aspect, relates to the preparation of improved polyurethane polymers, particularly molded polyurethane polymers, having unexpectedly improved green strength over prior art polyurethanes. The term "green strength" is used throughout the specification in its normally accepted sense and means the overall physical properties possessed by a molded but uncured polymer article compared to the same article after being subjected to a curing step, as for example either by standing or else by heating.

The improvement over the prior art resides particularly in the use of the novel stable liquid polyisocyanate blends of (a) and (b) in the proportions defined above as the polyisocyanate component (A) in the preparation of the polyurethane polymers in accordance with the present invention.

In another aspect, the present invention relates to the stable liquid polyisocyanate blends themselves in any proportion of (a) to (b).

Surprisingly, the liquid polyisocyanate blends notwithstanding the presence of at least one isocyanate terminated polyurethane prepolymer component, are stable over prolonged periods (at least a year) under normal room temperature conditions of about 20° C. in respect of such parameters as isocyanate content, viscosity, color, and the like Accordingly, the blends in accordance with the present invention, in any proportion of (a) to (b) are useful as the isocyanate component in any of the prior art methods known to those skilled in the art for the preparation of polyurethanes wherein liquid MDI type reactants are called for.

When formulating the blends specifically for use in the preparation of the polyurethane polymers in accordance with the present invention, in order to achieve optimum polymer properties, the proportions of the prepolymer to the liquefied MDI are chosen from within the ranges set forth above so that the isocyanate equivalent weight of the blend is from about 145 to about 200, and preferably from about 150 to about 180.

In the preferred proportions of the blends the liquid isocyanate terminated prepolymer is present within a range of from about 10 to about 30 percent by weight and the liquefied MDI within the corresponding range of from about 90 to about 70 percent by weight, most preferably about 15 to about 30 percent prepolymer and about 85 to about 70 percent liquefied MDI.

The liquid isocyanate terminated prepolymer components (a) of said blends are prepared from MDI and mixtures of specific polyols falling within the proportions set forth above with the particular proportions chosen to result in the equivalent weight range also set forth above for the prepolymer. By employing these polyols in the above proportions, a certain degree of so-called "hard and soft segments" are formed in the prepolymer.

The terms "hard and soft segments" refer respectively to the linkages derived from MDI with the (a2) low molecular weight diols or triols and the MDI with the (a1) higher molecular weight diols and triols. Surprisingly, it has been found that by using these particular classes of polyols (a1) and (a2) in the prescribed proportions that the prepolymer component (a) remains a stable clear liquid under normal room temperature conditions of about 20° C. while containing the random combination of hard and soft segments.

The polyol component (a1) has a functionality of from about 2 to about 3 and preferably about 2, and a molecular weight of at least about 1000, preferably a molecular weight falling within a range of about 1500 to about 4000, and most preferably about 1500 to about 2500. Included in the classes of polyols which can be used are the polyoxyalkylene polyols and polyester polyols, and the like which meet the above requirements.

A preferred group of polyols comprises the polypropyleneoxy diols and triols and polypropyleneoxy-polyethyleneoxy capped diols and triols obtained by the appropriate alkoxylation of water, ammonia, ethylene glycol, propylene glycol, trimethylolpropane, aniline, ethanolamine, and the like. Preferred within this group are the polypropyleneoxy diols and the polypropyleneoxy-polyethyleneoxy capped diols noted above.

The polyol component (a2) can be a diol, a triol, or mixtures thereof in any combination provided its average molecular weight falls within the range of about 115 to about 300. Typical of such polyols are 1,6-hexanediol, dipropylene glycol, tripropylene glycol, trimethylolpropane, tri-, tetra-, penta-, and hexaethylene glycol, or mixtures of polyethylene glycols wherein the average molecular weight is from about 140 to about 300.

Preferred members of the (a2) component are tripropylene glycol, trimethylolpropane, and polyethylene glycol of 200 average molecular weight.

Advantageously, the proportions of (a1) and (a2) in the mixture to be reacted with the MDI are from about 15 to about 70 percent by weight and about 85 to about 30 percent by weight respectively; preferably from about 25 to about 70 percent and 75 to 30 percent respectively.

The blended mixture of (a1) and (a2) is reacted together with the MDI in such proportions that the total hydroxyl equivalents of said (a1) and said (a2) arising from the above proportions fall within a range of from about 0.10 equivalent to about 0.65 equivalent per equivalent of MDI and preferably from about 0.2 to about 0.5 hydroxyl equivalent per equivalent of MDI.

The polyol mixture is reacted with the MDI using the conventional methods known to those skilled in the art for the preparation of prepolymers; see Saunders & Frisch, Polyurethanes: Chemistry and Technology, Part II, page 8 et seq., 1964, John Wiley and Sons, New York, N.Y. Typically, the MDI and polyol are mixed at elevated temperatures until the hydroxyl functions have been consumed, preferably under an inert atmosphere.

Advantageously, the liquid isocyanate terminated prepolymers prepared in accordance with the above descriptions, have an isocyanate equivalent weight falling within a range of from about 150 to about 600. A preferable equivalent weight range, in terms of the optimum properties obtainable in the polyurethane polymers obtained from the isocyanate blends, is from about 200 to about 400.

The liquefied MDI components (b) for use in the present blends are defined above.

The blends are prepared simply by mixing the two components (a) and (b) using any convenient means for carrying out such mixing.

The polyurethane polymers in accordance with the present invention can be prepared using any of the reaction techniques known in the art for the preparation of polyurethane polymers whether by hand mixing or machine mixing techniques; see the references cited supra for specific teaching on the preparation of polyurethanes. Notably, it is in the molded polyurethanes, particularly those prepared by the reaction injection molding (RIM) technique wherein the major unexpected benefits of the present polyurethanes are to be found; see U.S. Pat. No. 4,239,857 for typical RIM methods for preparing polyurethanes.

The organic polyol component (B) can be any of the polyols well known to those skilled in the art as being useful for the preparation of polyurethane polymers. Primarily, the choice of polyol functionality and molecular weight will depend on the specific polymer properties required and the type of polyol employed. Generally speaking, the organic polyol has a primary hydroxyl functionality of from about 2 to about 4 and a molecular weight of from about 1500 to about 8000. The preferred functionality is from about 2 to about 3 and the preferred molecular weight range is from about 2000 to about 7000, with a most preferred range of about 4000 to about 6500. The most preferred functionality is 3.

While the polyol has been defined hereinabove as containing primary hydroxyls this is not to imply that minor amounts of secondary hydroxyl groups cannot be present, either in the same molecule with the primary groups, or in a separate polyol component.

Illustrative, but not limiting, of the classes of polyols which can be used are the polyoxyalkylene polyethers; polyester polyols; polyol adducts derived from ethylene oxide with methylenedianiline and polymethylene polyphenylamine mixtures (in accordance with U.S. Pat. No. 3,499,009); polyols obtained by the Mannich condensation of a phenolic compound with formaldehyde, an alkanolamine, and ethylene oxide (in accordance with U.S. Pat. No. 3,297,597); vinyl reinforced polyether polyols, e.g. polyols obtained by the polymerization of styrene or acrylonitrile in the presence of the polyether; polyacetals prepared from glycols such as diethylene glycol and formaldehyde; polycarbonates, for example those derived from butanediol with diarylcarbonates; polyester amides; the resole polyols (see Prep. Methods of Polymer Chem. by W. R. Sorenson et al., 1961, page 293, Interscience Publishers, New York, N.Y.); and the polybutadiene resins having primary hydroxyl groups (see Poly Bd. Liquid Resins, Product Bulletin BD-3, October 1974, Arco Chemical Company, Div. of Atlantic Richfield, New York, N.Y.).

A preferred group of polyols comprises the polypropyleneoxy-polyethyleneoxy capped diols and triols obtained by the alkoxylation of water, ammonia, ethylene glycol, propylene glycol, trimethylolpropane, aniline, ethanolamine, and the like; the polyester diols obtained from the reaction of diabasic carboxylic acids such as succinic, adipic, suberic, azelaic, phthalic, isophthalic, and the like with alkylene glycols, and oxyalkylene glycols to form the corresponding polyalkylene, and polyoxyalkylene ester diols, or copolymers thereof; and the vinyl-resin reinforced propyleneoxy-ethyleneoxy capped diols and triols, particularly those polyethers reinforced with polyacrylonitrile.

The term "difunctional extender" (C) is used in the commonly accepted sense to one skilled in the art and means low molecular weight diols, diamines, aminoalcohols and the like having a molecular weight falling within a range from about 60 to about 400. Preferred as the difunctional extenders are the low molecular weight diols.

The term "low molecular weight diol" means a diol falling within the molecular weight range set forth above and is inclusive of alkylene glycols, oxyalkylene glycols, di(hydroxyalkylated) aromatic compounds and the like.

Illustrative, but not limiting, are ethylene glycol, 1,3-propylene glycol, 1,2-propylene glycol, 1,4-butanediol, 1,2-hexanediol, neopentyl glycol, and the like; diethylene glycol, dipropylene glycol, and the like; and dihydroxyalkylated aromatic compounds such as the bis(2-hydroxyethyl)ethers of hydroquinone and resorcinol; p-xylene-$\alpha,\alpha'$-diol; the bis(2-hydroxyethyl)ether of p-xylene-$\alpha,\alpha'$-diol; m-xylene-$\alpha,\alpha'$-diol and the bis(2-hydroxyethyl)ether thereof.

A preferred group of extender diols comprises ethylene glycol and 1,4-butanediol.

The relative equivalent proportions of said polyol (B) to said extender (C) can vary over a wide range depending on specific molecular weights and the properties desired in the polyurethane polymer. Generally speaking, the equivalent proportions of (B) to (C) is within the range of about 1:4 to about 1:40, and preferably about 1:10 to about 1:35.

The proportions of polyisocyanate (A) to the total active hydrogen equivalents comprised of the polyol, and the difunctional extender are such that the ratio of isocyanate equivalents to the total active hydrogen equivalents falls within a range of from about 0.95 to 1.10, preferably about 1.00 to about 1.08, and most preferably 1.02 to 1.08.

In an optional, and preferred embodiment in accordance with the present invention, a urethane forming catalyst (C) is present in said polyurethane forming ingredients.

Any of the catalysts conventionally employed in the art to catalyze the reaction of an isocyanate with a reactive hydrogen containing compound can be employed for this purpose; see, for example, Saunders et al., Polyurethanes, Chemistry and Technology, Part I, Interscience, New York, 1963, pages 228–232; see also, Britain et al., J. Applied Polymer Science, 4, 207–211, 1960. Such catalysts include organic and inorganic acid salts of, and organometallic derivatives of, bismuth, lead, tin, iron, antimony, uranium, cadmium, cobalt, thorium, aluminum, mercury, zinc, nickel, cerium, molybdenum, vanadium, copper, manganese and zirconium, as well as phosphines and tertiary organic amines. Representative organotin catalysts are stannous octoate, stannous oleate, dibutyltin diacetate, dibutyltin dioctoate, dibutyltin dilaurate, dibutyltin maleate, dibutyltin mercaptopropionate, dibutyltin didodecylmercaptide, dibutyltin bis(isoctylthioglycolate), and the like. Representative tertiary organic amine catalysts are triethylamine, triethylenediamine, N,N,N',N'-tetramethylethylenediamine, N,N,N',N'-tetraethylethylenediamine, N-methylmorpholine, N-ethylmorpholine, N,N,N',N'-tetramethylguanidine, N,N,N',N'-tetramethyl-1,3-butanediamine, N,N-dimethylethanolamine, N,N-diethylethanolamine, N,N-dimethylcyclohexylamine, and the like, and mixtures of the above in any combination.

The preferred catalysts are the organo metallic compounds and particularly the dialkyl tin salts such as the dibutyltin compounds noted above.

The amount of catalyst employed can vary considerably according to the particular reactants in the polymer forming mixture and the particular catalyst involved. Optimum catalyst concentration is easily determined using trial and error tests by one skilled in the art. Generally speaking, the catalyst or mixture of catalysts will be employed within a range of from about 0.01 percent by weight to about 5.0 percent by weight preferably from about 0.02 to about 3.0 percent, most preferably from about 0.05 to about 0.5 percent based on the total weight of isocyanate, polyol, and extender.

Optionally, blowing agents may be employed even in the production of molded polyurethanes wherein compact tough skinned surfaces are desired. Any of the blowing agents known to those skilled in the art can be used including water and the fluorocarbon blowing agents. The latter are preferred and generally are halogenated aliphatic hydrocarbons which can also be substituted by chlorine and/or bromine in addition to the fluorine content; see U.S. Pat. No. 3,745,133, column 11, lines 25 to 38 which disclosure relating to fluorocarbon blowing agents is incorporated by reference herein.

Also, inert gases (e.g. nitrogen) may be introduced at the polymer forming stage to provide whatever degree of blowing is desired from micro-cellular to macro-cellular in nature.

Other optional addditives such as dispersing agents, cell stabilizers, surfactants, flame retardants, colorants, and the like can be added to the polyurethane polymers in accordance with the present invention.

Although the polyurethanes in accordance with the present invention can be prepared in the absence of any mechanical restraints (i.e. molds), as noted above, it is in the preparation of molded polymers, particularly RIM applications wherein the most unique and unexpected properties of the present polymers reside. They not only have excellent flexural modulus and heat resistant properties over a high hardness range, but, additionally, they are characterized by superior and unexpected green strength properties prior to any post-molding curing procedure when compared to prior art materials.

Surprisingly, the additive prepolymers in the novel isocyanate blends act as annealers to effect the curing of the molded polyurethanes at lower temperatures than prior art molded polyurethanes. This in turn, results in the improved green stengths.

Moreover, the effect of causing the curing of the polyurethanes at lower temperatures than prior art materials results in additional benefits such as lower molding temperatures, and/or lower cure times and temperatures.

However, the newly discovered green strength properties of the present polymers provides for the additional benefits of a higher demold rate and the molding of more complicated profiles such as those parts having large undercuts. That is to say the molded polyurethane parts can be demolded without the need of prolonged mold residence times without fear of deformation of the part. This advantage becomes of increasing importance in complicated parts having large undercuts. Obviously, these advantages speed up a production line, cut down on reject rate, and thereby lead to considerable economic advantage.

Accordingly, the molded polyurethane articles in accordance with the present invention are useful for the preparation of solid cast elastomers, solid and microcellular RIM elastomers, and elastoplastics, all within a Shore D hardness range of from about 45 to about 80. The molded products find particular utility as auto parts such as car bumpers, body elements, panels, doors, engine hoods, skirts, air scoops, and the like. Further, the thermosetting nature of the present polymers results in their good high temperature performance characteristics which make them suitable for industrial elastomer applications where high temperature resistance is needed such as in paint drying chambers.

The following examples describe the manner and process of making and using the invention and set forth the best mode contemplated by the inventors of carrying out the invention but are not to be construed as limiting.

EXAMPLE 1

The following low modulus molded polyurethane samples were prepared using hand-mix technique by reacting the ingredients in the proportions of parts by weight set forth in Table I. Sample 4 is in accordance with the present invention while samples 1, 2, and 3 are comparison samples which are not within the invention.

The A or isocyanate components for samples 2 through 4 were prepared by blending together the parts of Isocyanate I and the parts of prepolymer additive (Prepol Add 1) set forth in Table I. The A component for sample 1 was simply the Isocyanate I.

The Isocyanate I is a modified liquid methylenebis(phenyl isocyanate) (MDI) obtained by treating a methylenebis(phenyl isocyanate) comprised of about 94 percent by weight of the 4,4'-isomer and 6 percent of the 2,4'-isomer in accordance with U.S. Pat. No. 3,384,653 so that about 9.6 percent of the original isocyanate groups were consumed to form carbodiimide. The isocyanate equivalent weight of this liquid product was 143.7 and contained about 0.056 equivalent of carbodiimide.

The Prepol Add 1 was prepared by first blending together in the proportions of 34 parts by weight (0.034 equiv.) of a 2000 molecular weight polypropylene glycol and 33 parts (0.344 equiv.) of tripropylene glycol. This blended mixture was then added slowly during stirring to 125 parts (1.0 equiv.) of 4,4'-methylenebis(phenyl isocyanate) at about 55° to 60° C. under a blanket of nitrogen and the reactants allowed to exotherm but not in excess of 80° C. The Prepol Add 1 had an observed isocyanate equivalent weight of 323.

The B or polyol components were prepared by blending together the ingredients set forth in Table I. The A and B components were mixed in quart cups for a 7 to 10 second mix period using a 2300 RPM drill press motor fitted with a stirring blade. The stirred reaction mass was immediately poured into an 8"×8"×⅛" chrome steel mold heated at 150°–180° F. and held for 2 to 3 minutes in the heated mold. Then the samples were demolded, observed and tested for green strength, and shortly thereafter post-cured by storage in an oven at 250° F. for 1 hour before being subjected to the test procedures set forth in Table I.

The test for green strength is an art recognized one in which the freshly demolded piece while still warm and without curing is bent manually to about a 90 degree bend to form a crease. Visual observation is made of the extent of surface cracking on the sample. The results of such a test procedure are not as meaningful when the sample is still at its molding temperature as when it has cooled slightly because at elevated temperatures the sample may have a greater elasticity than at a cooler temperature especially in the uncured state and thereby given an erroneous observation of good green strength. The observations of green strength set forth in Table I were actually made about 4 minutes after the initial shot to fill the mold such that the samples had cooled slightly from the molding temperature. The 4 minute period included a mold residence time of about 1.5 minutes.

All of the physical test results of the 4 samples were comparable after the post-cure treatment with only a slight decrease in flex strength properties with the addition of the Prepol Add 1 components. However, the green strength of sample 1 was very poor. At the same time, the green strengths of samples 2 and 3, while showing increasing improvement respectively over sample 1, still lacked sufficient strength under the existing molding conditions. Contrastingly, sample 4 in accordance with the present invention contained sufficient Prepol Add 1 and therefore possessed good green strength with no surface cracking whatsoever.

TABLE I

| Sample | 1 | 2 | 3 | 4 |
|---|---|---|---|---|
| Ingredients (pts. by wt.) | | | | |
| Component A: | | | | |
| Isocyanate I | 128.9 | 126.94 | 124.97 | 119.0 |
| Prepol Add 1 | — | 4.32 | 8.55 | 21.4 |
| Blend I.E. | 143.7 | 146.3 | 148.8 | 156.5 |
| Component B: | | | | |
| SF 6503[1] | 100 | 100 | 100 | 100 |
| Ethylene glycol | 25 | 25 | 25 | 25 |
| Surfactant[2] | 0.1 | 0.1 | 0.1 | 0.1 |
| Dibutyl tin dilaurate | 0.1 | 0.1 | 0.1 | 0.1 |
| NCO Index | 1.05 | 1.05 | 1.05 | 1.05 |
| % Hard segment content | 57.93 | 57.98 | 58.02 | 58.15 |
| Properties: | | | | |
| Density, pcf | 69.2 | 68.2 | 68.9 | 69.7 |
| Hardness, Shore D[3] | 65 | 66 | 66 | 65 |
| Flex. mod. (20° C.)psi[4] | 67,500 | 63,730 | 62,600 | 60,770 |
| Flex. str., psi | 3,257 | 3,074 | 3,010 | 2,950 |
| Heat sag, inches[5] | | | | |
| at 250° F./for 1 hr. | 0.04 | 0.06 | 0.06 | 0.07 |
| at 325° F./½ hr. | 0.33 | 0.41 | 0.32 | 0.35 |
| Sample at demold | cracks after demold | cracks to lesser extent after demold | cracks to lesser extent after demold | good green strength, no cracking |

Footnotes to Table I
[1]SF 6503 is 6500 M.W. polypropyleneoxy-polyethyleneoxy triol, OH E.W. = 2100, (supplied by Jefferson Chemical Co.).
[2]Surfactant is a proprietary blend of alkylarylsulfonate and alkoxylated alcohols.
[3]Hardness, Shore D Durometer hardness according to ASTM method D2240.
[4]Flexural modulus is determined in accordance with ASTM Test Method D-790.
[5]Heat sag is determined in accordance with Test CTZ 006AA of the Chevrolet Div. of General Motors Corp., Flint, Mich. It is the amount, in inches, that a 1 inch wide sample with a 4 inch long unsupported length droops under its own weight when held at one end in a horizontal position under the specified conditions of time and temperature.

EXAMPLE 2

The following intermediate modulus molded polyurethane samples were prepared using the hand-mix technique described in Example 1 and the ingredients in the proportions by weight set forth in Table II. Samples 5, 6, and 9 are comparison samples not in accordance with the present invention while samples 7, 8, and 10 through 12 are so in accordance.

The Prepol Add 2 was prepared by first blending together in the proportions of 34.8 parts by weight (0.036 equiv.) of a 2000 molecular weight polyoxypropylene-polyoxyethylene glycol containing about 45 percent by weight of ethylene oxide residues and having a primary hydroxyl content of about 93 percent (available under the tradename of Poly G 55-56 supplied by Olin Corp., New Haven, Conn.) and 34.7 parts (0.347 equiv.) of a polyethylene glycol having an average molecular weight of about 200 (available under the tradename Carbowax 200 supplied by Union Carbide Corp., New York, N.Y.). The blended mixture was reacted with 125 parts (1.0 equiv.) of MDI using the procedure described in Example 1. The Prepol Add 2 had an observed isocyanate equivalent weight of 311.

Similarly, Prepol Add 3 was prepared by reacting 125 parts of MDI and a blend comprising 24.7 parts (0.0255 equiv.) of the same polyoxypropylene-polyoxyethylene glycol employed in Prepol Add 2 and 12.1 parts (0.2707 equiv.) of trimethylolpropane. The Prepol Add 3 had an isocyanate equivalent weight of 231.9.

All of the samples 5 through 12 were comparable in overall physical properties after they had been subjected to the post-cure step of 250° F. for 1 hour. However, upon demold samples 5, 6, and 9 had very poor green strength as shown by the hand flex method described in Example 1 wherein sample cracking and brittleness was observed. Sample 5 with no additive, and sample 6 with insufficient additive, displayed much cracking on demold. Sample 9 not in accordance with the invention can be compared directly with sample 8 in accordance with the invention. The ingredients which go to make up the Prepol Add 2 in sample 8 are used individually, in identical amounts, in sample 9. The MDI portion was added into the A component while the Carbowax 200 and Poly G 55-56 are in the B component. Samples 8 and 9 have identical components in identical amounts and differ only in their appearance in the respective formulation with the Prepol Add 2-liquid MDI blended A component (sample 8) versus the individual unreacted components (sample 9). Sample 8 was characterized by good green strength whereas sample 9 was brittle and showed cracking.

TABLE II

| Sample | 5 | 6 | 7 | 8 | 9 | 10 | 11 | 12 |
|---|---|---|---|---|---|---|---|---|
| Ingredients (pts. by wt.) | | | | | | | | |
| Component A: | | | | | | | | |
| Isocyanate I | 163 | 158.22 | 151.03 | 139.05 | 139.05 | 151.48 | 139.95 | 135.1 |
| MDI | — | — | — | — | 32.9 | — | — | — |
| Prepol Add 1 | — | — | — | — | — | 24.83 | 49.68 | — |
| Prepol Add 2 | — | 10.09 | 25.28 | 50.46 | — | — | — | — |
| Prepol Add 3 | — | — | — | — | — | — | — | 45.0 |
| Blend I.E. | 143.7 | 148.4 | 155.4 | 167.1 | — | 155.4 | 167.2 | 158.8 |
| Component B: | | | | | | | | |
| SF 6503 | 100 | 100 | 100 | 100 | 100 | 100 | 100 | 100 |
| Ethylene glycol | 32 | 32 | 32 | 32 | 32 | 32 | 32 | 32 |
| Surfactant | 0.1 | 0.1 | 0.1 | 0.1 | 0.1 | 0.1 | 0.1 | 0.1 |
| Dibutyl tin dilaurate | 0.116 | 0.116 | 0.116 | 0.116 | 0.116 | 0.116 | 0.116 | 0.116 |
| Poly G 55–56 | — | — | — | — | 8.91 | — | — | — |
| Carbowax 200 | — | — | — | — | 8.65 | — | — | — |
| NCO Index | 1.05 | 1.05 | 1.05 | 1.05 | 1.05 | 1.05 | 1.05 | 1.05 |
| % Hard segment | 63.79 | 63.76 | 63.72 | 63.65 | 63.65 | 63.75 | 63.71 | 63.31 |
| Properties: | | | | | | | | |
| Density, pcf | 67.6 | 64.4 | 64.6 | 70.4 | 69.2 | 70.6 | 70.7 | 71.7 |
| Hardness, Shore D | 70 | 71 | 69 | 70 | 70 | 72 | 72 | 73 |
| Flex. mod. (20° C.) psi | 109,450 | 101,610 | 94,362 | 95,136 | 83,622 | 103,370 | 98,300 | 119,810 |
| Flex. str., psi | 4826 | 4388 | 4130 | 4180 | 3861 | 4527 | 4388 | 5287 |
| Heat sag, inches | | | | | | | | |
| at 250° F./1 hr. | 0.02 | 0.03 | 0.03 | 0.06 | 0.08 | 0.06 | 0.03 | 0.03 |
| at 325° F./½ hr.* | 0.18(0.04) | 0.23 | 0.30 | 0.35(0.18) | 0.64(0.15) | 0.50 | 0.61 | 0.41 |
| Sample at demold | much cracking | much cracking | improved green strength just slight cracking | good green strength no cracking | brittle cracking | good green strength no cracking | good green strength no cracking | good green strength no cracking |

*Values of heat sag in parenthesis were determined on samples receiving an additional post cure of 325° F. for ½ hr. in addition to the 250° F./1 hr.

EXAMPLE 3

The following high modulus molded polyurethane samples were prepared using the hand-mix technique described in Example 1 and the ingredients in the proportions by weight set forth in Table III. Samples 13 and 19 are not in accordance with the present invention while samples 14 through 18 are so in accordance.

In this high modulus series of samples a definite improvement in flex modulus and flex strength was observed for samples 14 through 18 over that of sample 13. Further, with samples 14 to 18 the heat sag values in most cases were equal to, or, better than, the value for sample 13. However, in the area of green strength upon demold, a property which becomes increasingly difficult to satisfy as sample modulus increases, the samples 14 through 18 are all considered to have adequate good green strength whereas samples 13 and 19 do not. It is quite surprising to find such good green strengths for samples having such high moduli values, particularly in view of the fact that these are obtained via hand-mix technique rather than by a much more efficient machine mixing and metering method. Samples 14 and 17 showed very slight cracking but in comparison to sample 13 their green strengths were considered much superior and adequate for proper demolding, especially in view of the high level of the moduli values and the fact that both had higher moduli values than sample 13.

Similarly to the comparison between samples 8 and 9 of Example 2, samples 18 and 19 can be compared directly. Sample 19 not in accordance with the present invention contained the same ingredients as sample 18 but not in the form of the Prepol Add 3 of component A of sample 18 which is in accordance with the present invention. Green strength was completely lacking in the case of sample 19 whereas sample 18 showed good green strength in spite of its much higher modulus over the former sample.

TABLE III

| Sample | 13 | 14 | 15 | 16 | 17 | 18 | 19 |
|---|---|---|---|---|---|---|---|
| Ingredients (pts. by wt.) | | | | | | | |
| Component A: | | | | | | | |
| Isocyanate I | 250.6 | 234.34 | 218.07 | 201.75 | 207.75 | 154.7 | 154.7 |
| Prepol Add 2 | — | 34.26 | 68.51 | 102.76 | — | — | — |
| Prepol Add 3 | — | — | — | — | 79.25 | 154.7 | — |
| MDI | — | — | — | — | — | — | 119.6 |
| Blend I.E. | 143.7 | 154.0 | 164.3 | 174.6 | 158.8 | 177.4 | — |
| Component B: | | | | | | | |
| SF-6503 | 100 | 100 | 100 | 100 | 100 | 100 | 100 |
| Ethylene glycol | 50 | 50 | 50 | 50 | 50 | 50 | 50 |
| Poly G 55–56 | — | — | — | — | — | — | 23.38 |
| Trimethylolpropane | — | — | — | — | — | — | 11.7 |
| Surfactant | 0.1 | 0.1 | 0.1 | 0.1 | 0.1 | 0.1 | 0.1 |
| Dibutyl tin dilaurate | 0.1 | 0.1 | 0.1 | 0.1 | 0.1 | 0.1 | 0.1 |
| NCO Index | 1.05 | 1.05 | 1.05 | 1.05 | 1.05 | 1.05 | 1.05 |
| % Hard segment | 73.33 | 72.85 | 72.40 | 72.0 | 71.8 | 70.99 | 70.99 |
| Properties: | | | | | | | |

TABLE III-continued

| Sample | 13 | 14 | 15 | 16 | 17 | 18 | 19 |
|---|---|---|---|---|---|---|---|
| Density, pcf | 68.9 | 68.3 | 71.0 | 71.6 | 69.6 | 71.8 | 68.4 |
| Hardness, Shore D | 76 | 78 | 77 | 77 | 80 | 80 | 77 |
| Flex. mod. (20° C.) psi | 172,000 | 187,450 | 185,872 | 174,896 | 194,212 | 224,400 | 182,623 |
| Flex. str., psi | 7031 | 7622 | 7450 | 7219 | 8316 | 9381 | 7828 |
| Heat sag, inches | | | | | | | |
| 250° F./1 hr. | 0.01 | 0.00 | 0.00 | 0.04 | 0.03 | 0.11 | 0.06 |
| 325° F./½hr.[1] | 0.30(0.07) | 0.25 | 0.26(0.17) | 0.41(0.18) | 0.25(0.06) | 0.45(0.25) | 0.55(0.11) |
| Gardner Impact resistance[2] (ft.-lbs.) | 5.9 | 1.67 | 4.42 | 10.5 | 3.18 | 2.27 | — |
| Sample at demold | brittle and cracks | improved green strength | much improved green strength just slight cracking | good green strength no cracking | very slight cracking but good demold strength | good green strength, no cracking | brittle, cracks on demold |

Footnotes to Table III
[1]Values of heat sag in parenthesis were determined on samples receiving an additional post cure of 325° F. for ½ hr. in addition to the 250° F./1 hr. cure.
[2]Impact resistance in ft.-lbs. is determined on a Gardner variable impact tester model IG-115 (Gardner Laboratory, Inc., 5521 Landy Lane, Bethesda, Maryland). A number of samples measuring 2" × ½" × ½" are subjected to impact by dropping a 1.39 pound round nose steel rod upon one surface, from varying heights. Sample fracture is registered as a failure. The value in ft.-lbs., assigned as the impact resistance of a given sample, represents the mean break or failure height and is calculated by the Bruceton Staircase statistical technique [see Report No. 101.1 R, SRG-P, No. 40 of the Applied Mathematics Panel of the National Defense Research Committee (July 1944); O. R. Weaver, Materials Research and Standards, Vol. 6, No. 6, pp. 285-292 (June 1966)].

EXAMPLE 4

The following intermediate modulus molded polyurethane samples were prepared using a pilot plant scale reaction injection molding (RIM) machine and the ingredients in the proportions by weight set forth in Table IV. Samples 20, 21, and 22 (not in accordance with the invention) are control samples at the three NCO to OH ratios set forth in the table. Samples 23 to 28 are in accordance with the present invention with 23 to 25 at one level of additive prepolymer, and 26 to 28 at a different level of additive prepolymer, having NCO to OH ratios corresponding to the series of ratios for samples 20 to 22.

One tank of the RIM machine was charged with the A component while the second tank was charged with the B component. Metering pumps from each tank were used to deliver the ingredients into the impingement mixing head of the RIM machine. After mixing, the reaction mixture was directed into a metal mold measuring 16"×60" by three varying thicknesses of 0.100", 0.150", and 0.180" at a mold temperature of 150°-160° F. All physical properties and tests reported here were done on the 0.150" thickness section.

Upon demold the pieces were tested and observed for green strength according to the method previously described. Following this, the samples were cured at 250° F. for 1 hour before being subjected to the test procedures set forth in Table IV.

Samples 20 to 22 at all three NCO to OH ratios showed poor green strength with evidence of much surface cracking. Samples 23 to 25 on the other hand while showing evidence of slight cracking were considered to have adequate green strength for demolding parts particularly in view of the combination of the relatively high modulus combined with the relatively low mold temperature. In point of fact, when two separate moldings of the same formulation were made but at higher mold temperatures (one at 175°-180° F. and another at 200°-210° F.) no cracking at all could be observed in the freshly demolded pieces.

Samples 26 to 28 were characterized by good green strength and no cracking whatsoever.

Generally speaking, the physical properties of the samples 23 to 28 are superior to the samples 20 to 22, particularly in regard to better elongation, split tear strength, and impact strength. The additive prepolymers in the samples of the invention are not detrimental to their good heat sag values at both of the test temperatures. Only the flex modulus values showed a slight fall-off over the 20-22 series.

The two liquid isocyanate blends in accordance with the present invention, as noted above, were employed at one level of additive prepolymer in samples 23 to 25 (85/15 weight percent of Isocyanate I to Prepol Add 2) and at another level in samples 26 to 28 (75/25 weight percent of Isocyanate I to Prepol Add 2). The stabilities of the two yellow colored mobile liquid blends were measured by determining their initial isocyanate equivalent values and then redetermining the values on samples after about 12 months of storage at room temperature (about 20° C.).

A comparison of the initial and final I.E. values tabulated below clearly show the stability of both samples. Also, both samples showed no change in color and remained as clear mobile liquids over the test period.

| | I.E. | |
|---|---|---|
| | Initial | Final |
| 85/15 Blend | 158 | 159 |
| 72/25 Blend | 168 | 169 |

TABLE IV

| Sample | 20 | 21 | 22 | 23 | 24 |
|---|---|---|---|---|---|
| Ingredients (pts. by wt.) | | | | | |
| Component A: | | | | | |
| Isocyanate I | 161.0 | 166.1 | 171.9 | 147.48 | 152.5 |
| Prepol Add 2 | — | — | — | 26.03 | 26.91 |
| Blend I.E. | 143.7 | 143.7 | 143.7 | 158 | 158 |
| Component B: | | | | | |
| SF 6503 | 100 | 100 | 100 | 100 | 100 |
| Ethylene glycol | 32 | 32 | 32 | 32 | 32 |
| Surfactant | 0.1 | 0.1 | 0.1 | 0.1 | 0.1 |
| Dibutyl tin dilaurate | 0.15 | 0.15 | 0.15 | 0.15 | 0.15 |

TABLE IV-continued

| | | | | | |
|---|---|---|---|---|---|
| NCO Index | 1.02 | 1.06 | 1.10 | 1.02 | 1.06 |
| Properties: | | | | | |
| Density, g/cc. | 1.158 | 1.161 | 1.166 | 1.156 | 1.156 |
| Hardness, Shore D | 68 | 73 | 71 | 72 | 71 |
| Flex. mod. (20° C.), kpsi | 94.9 | 100.1 | 106.1 | 87.9 | 92.5 |
| Flex. mod. ratio −20° F./+158° F. | — | 3.2 | — | — | 4.1 |
| Tensile str., psi | 4570 | 4540 | 4440 | 4355 | 4375 |
| % Elongation @break | 146 | 142 | 130 | 165 | 165 |
| Tensile set % | 52 | 58 | 55 | 65 | 65 |
| Split tear, pli | 236 | 254 | 239 | 266 | 299 |
| Notched Izod Impact* at 68° F. ft.-lb./in | 14.7 | 14.4 | 14.4 | 16.0 | 16.2 |
| at −20° F., ft.-lbs./in. | 5.6 | 3.1 | 2.7 | 9.8 | 5.9 |
| Gardner Impact at −20° F. ft.-lbs. | 5.2 | 4.4 | 4.0 | 7.2 | 5.6 |
| Heat sag, inches 250° F./1 hr. | 0.10 | 0.09 | 0.11 | 0.07 | 0.08 |
| 325° F./½ hr. | 0.78 | 0.57 | 0.37 | 0.79 | 0.61 |
| Sample at demold | surface cracks | surface cracks | surface cracks | slight cracking better than control | slight cracking better than control |

| Sample | 25 | 26 | 27 | 28 |
|---|---|---|---|---|
| Ingredients (pts. by wt.) | | | | |
| Component A: | | | | |
| Isocyanate I | 158.27 | 138.75 | 144.23 | 149.85 |
| Prepol Add 2 | 27.93 | 46.35 | 48.08 | 49.95 |
| Blend I.E. | 158 | 168 | 168 | 168 |
| Component B: | | | | |
| SF 6503 | 100 | 100 | 100 | 100 |
| Ethylene glycol | 32 | 32 | 32 | 32 |
| Surfactant | 0.1 | 0.1 | 0.1 | 0.1 |
| Dibutyl tin dilaurate | 0.15 | 0.15 | 0.15 | 0.15 |
| NCO Index | 1.10 | 1.02 | 1.06 | 1.10 |
| Properties: | | | | |
| Denstiy, g/cc. | 1.167 | 1.147 | 1.156 | 1.164 |
| Hardness, Shore D | 72 | 69 | 71 | 73 |
| Flex. mod. (20° C.), kpsi | 103.5 | 84.6 | 95.2 | 103.4 |
| Flex. mod. ratio −20° F./+158° F. | — | — | 4.2 | — |
| Tensile str., psi | 4390 | 4355 | 4245 | 4250 |
| % Elongation at break | 165 | 155 | 145 | 140 |
| Tensile set % | 75 | 60 | 60 | 60 |
| Split tear, pli | 290 | 308 | 309 | 305 |
| Notched Izod Impact* at 68° F., ft.-lbs./in. | 15.8 | 17.1 | 18.0 | 16.5 |
| at −20° F. ft.-lbs./in. | 2.9 | 11.7 | 7.4 | 4.0 |
| Gardner Impact at −20° F. ft.-lbs. | 4.2 | 2.8 | 2.8 | 2.8 |
| Heat sag, inches 250° F./1 hr. | 0.08 | 0.12 | 0.11 | 0.03 |
| 325° F./½ hr. | 0.31 | 0.99 | 0.88 | 0.43 |
| Sample at demold | slight cracking better than control | good green strength, no cracking | good green strength, no cracking | good green strength, no cracking |

*Notched Izod Impact is determined in accordance with ASTM Test Method D-256-56.

EXAMPLE 5

The following high modulus molded polyurethane samples were prepared using the RIM technique described in Example 4 and the ingredients in the proportions by weight set forth in Table V. Samples 29 and 30 are in accordance with the present invention while 31 is not so in accordance. All samples were cured at 325° F. for ½ hr.

Because of the high modulus values of the resulting polyurethane samples, it was found, in the case of samples 29 and 30, that a mold temperature of about 200° F. was required to provide successfully demolded samples characterized by good green strength and completely devoid of surface cracks. In the case of sample 31 which was extremely difficult to process it was necessary to raise the mold temperature to 260° F. to obtain pieces that did not crack on demold. However, at this high mold temperature the pieces became soft, floppy, and easily took a set on cooling. In sample 31 the ratio of the equivalent proportions of the SF 6503 component to the ethylene glycol was 1:51.6 which is outside the present invention.

The physical properties of samples 29 and 30 were found to be good including good elongation and excellent Izod impact both at room temperature and at −20° F. notwithstanding their high moduli values.

Sample 31 was a poor material as evidenced by the low density, a cellular core, low elongation, low impact, etc.

TABLE V

| Sample | 29 | 30 | 31 |
|---|---|---|---|
| Ingredients (pts. by wt.) | | | |
| Component A: | | | |
| Isocyanate I | 210.5 | 219.2 | 343.6 |
| Prepol Add 2 | 70.2 | 73.1 | 114.5 |
| Blend I.E. | 168 | 168 | 168 |
| Component B: | | | |
| SF 6503 | 100 | 100 | 100 |
| Ethylene glycol | 47.75 | 47.75 | 80 |
| Surfactant | 0.1 | 0.1 | 0.05 |
| Dibutyl tin dilaurate | 0.15 | 0.15 | 0.15 |
| NCO Index | 1.04 | 1.08 | 1.025 |
| Properties: | | | |
| Density, g/cc. | 1.10 | 1.12 | 0.857 |
| Hardness, Shore D | 73 | 73 | 75 |
| Flex. mod. (20° C.), kpsi | 147 | 160 | 151 |
| Tensile str., psi | 5213 | 4984 | 3380 |
| % Elongation at break | 144 | 136 | 41 |
| Tensile set % | 93 | 83 | 21 |
| Notched Izod Impact at 68° F., ft.-lbs./in. | 13.37 | 12.56 | 3.69 |
| at −20° F. | 5.22 | 2.83 | 1.35 |
| Gardner Impact (68° F.) (ft.-lbs.) | no break | no break | 1.52 |
| Heat sag, inches 140° C./1 hr. | 0.02 | 0.10 | 0.22* |
| 325° F./½ hr. | 0.20 | 0.05 | 0.96 |
| Sample at demold | good green strength, no cracking | good green strength, no cracking | no cracking but impossible to demold properly |

*Determined at 250° F./1 hr.

EXAMPLE 6

Table VI sets forth a comparison of properties of five molded polyurethanes prepared using the RIM technique described above and two formulations, one called Formulation A (same as sample 21, example 4 above) not in accordance with the present invention, and the other called Formulation B (same as sample 24 of example 4 above) in accordance with the present invention. The comparison clearly shows the superior rate of annealing or attainment of maximum properties of the molded polyurethanes of this invention.

Two moldings of A both at a mold temperature of 150° to 160° F. were made. One received no post-curing while the other was subjected to a standard post-cure of 250° F. for 1 hour. The properties set forth in Table VI were determined about 2 hours after demold except where noted. The properties determined after the post-cure are assumed to be maximum. The comparison of the two sets of properties shows clearly that the sample with no post-cure has nowhere near its maximum properties.

Three moldings of B were made with two at the mold temperature of 150° to 160° F. and the third at 200° to 210° F. Only one of the lower temperature moldings was post-cured and at 250° F. for 1 hour. The properties attained in the 150° to 160° F. molded sample receiving no post-cure, while not at their maximum levels, are very much closer to the maximum values as compared to the A molding. Molding formulation B at the higher temperature range of 200° to 210° F. showed almost identical properties to the lower temperature molding. However, the 200° to 210° F. molded material had its properties determined after only 12 minutes from demold compared to the 2 hour span for the other sample.

The noteworthy comparison is between the moldings of A and B each molded at 150° to 160° F. and each with no post-cure. The level of properties of B is dramatically different from A.

TABLE VI

| | Molding Temp. | | | | |
|---|---|---|---|---|---|
| | Formulation A | | Formulation B | | |
| | 150–160° F. | | 150–160° F. | | |
| | no p.c. | p.c. (250° F./ hr.) | no p.c. | p.c. (250° F./ 1 hr.) | 200–210° F.* no p.c. |
| Properties: 2 hrs. after demold: % | | | | | |
| Elongation | 80 | 230 | 160 | 235 | 160 |
| % Set | 30 | 135 | 88 | 130 | 90 |
| Tensile str., psi | 2650 | 3100 | 3350 | 3675 | 3400 |

*Properties determined 12 minutes after demold.

We claim:

1. In a polyurethane polymer comprising the reaction product of an organic polyisocyanate (A), an organic polyol (B), and a difunctional extender (C) wherein the equivalent proportions of said polyol (B) to said extender (C) is within the range of about 1:4 to about 1:40 and the ratio of isocyanate equivalents of (A) to the total active hydrogen equivalents of said (B) and said (C) is from about 0.95 to about 1.10, wherein the improvement comprises employing as the polyisocyanate (A) a composition comprising a blend of,
   (a) from about 10 to about 50 percent by weight of a liquid isocyanate terminated prepolymer having an isocyanate equivalent weight of from about 150 to about 600 and comprising the reaction product of methylenebis(phenyl isocyanate) with a polyol mixture comprising:
      (1) from about 15 to about 70 percent by weight of a polyol having a functionality of from about 2 to about 3 and a molecular weight of at least 1000; and
      (2) from about 85 to about 30 percent by weight of a polyol having a molecular weight falling within a range of from about 115 to about 300 selected from the group consisting of a diol, a triol, and mixtures thereof,
   wherein the total hydroxyl equivalents of said (1) and said (2) fall within a range of from about 0.10 to about 0.65 equivalent per equivalent of said methylenebis(phenyl isocyanate); and
   (b) from about 90 to about 50 percent by weight of a liquefied methylenebis(phenyl isocyanate), provided the proportions of said prepolymer (a) and said liquefied methylenebis(phenyl isocyanate) (b) while falling within the ranges set forth above are such that the isocyanate equivalent weight of said blend is from about 145 to about 200.

2. A polyurethane according to claim 1 wherein said polyol (B) is a polypropyleneoxy-polyethyleneoxy triol having a molecular weight of from about 1500 to about 8000.

3. A polyurethane according to claim 1 wherein said extender (C) is a low molecular weight diol.

4. A polyurethane according to claim 1 wherein said polyol (a2) is a diol.

5. A polyurethane according to claim 1 wherein said polyol (a2) is a triol.

6. A polyurethane according to claim 1 wherein a urethane forming catalyst is present in said polyurethane forming ingredients.

7. In a polyurethane polymer comprising the reaction product of an organic polyisocyanate (A), a polypropyleneoxy-polyethyleneoxy triol (B) having a molecular weight of from about 2000 to about 7000, a low molecular weight diol extender (C), and a urethane catalyst (D) wherein the equivalent proportions of said polyol (B) to said extender (C) is within the range of about 1:4 to about 1:40 and the ratio of isocyanate equivalents of (A) to the total active hydrogen equivalents of said (B) and said (C) is from about 0.95 to about 1.10, wherein the improvement comprises employing as the polyisocyanate (A) a composition comprising a blend of,
   (a) from about 10 to about 30 percent by weight of a liquid isocyanate terminated prepolymer having an isocyanate equivalent weight of from about 200 to about 400 comprising the reaction product of methylenebis(phenyl isocyanate) with a polyol mixture comprising:
      (1) from about 15 to about 70 percent by weight of a polyol having a functionality of about 2 and a molecular weight of from about 1500 to about 4000, and
      (2) from about 85 to about 30 percent by weight of a polyol having a molecular weight falling within a range of from about 115 to about 300 selected from the group consisting of a diol, a triol, and mixtures thereof,
   wherein the total hydroxyl equivalents of said (1) and said (2) fall within a range of from about 0.2 to about 0.5 equivalent per equivalent of said methylenebis(phenyl isocyanate); and
   (b) from about 90 to about 70 percent by weight of a liquid carbodiimide-containing methylenebis(phenyl isocyanate) having an isocyanate equivalent weight of from about 130 to about 180,
provided the proportions of said prepolymer (a) and said liquid carbodiimide-containing methylenebis(phenyl isocyanate) (b) while falling within the ranges set forth above are such that the isocyanate equivalent weight of said blend is from about 145 to about 200.

8. A polyurethane according to claim 7 wherein the equivalent proportions of said polyol (B) to said extender (C) are within the range of about 1:10 to about 1:35 and the ratio of isocyanate equivalents of (A) to the total active hydrogen equivalents of said (B) and said (C) is from about 1.00 to about 1.08.

9. A polyurethane according to claim 7 wherein the diol extender (C) is ethylene glycol.

10. A polyurethane according to claim 7 wherein the polyol (a2) is a diol.

11. A polyurethane according to claim 7 wherein the polyol (a2) is a triol.

12. A polyurethane polymer comprising the reaction product of,
A. a polyisocyanate blend comprising,
(a) from about 15 to about 30 percent by weight of a liquid isocyanate terminated prepolymer having an isocyanate equivalent weight of from about 200 to about 400 comprising the reaction product of 4,4'-methylenebis(phenyl isocyanate) with a polyol mixture comprising:
(1) from about 15 to about 70 percent by weight of a polyalkyleneoxy glycol having a molecular weight of from about 1500 to about 2500; and
(2) from about 85 to about 30 percent by weight of a polyol having a molecular weight falling within a range of from about 115 to about 300 selected from the group consisting of a diol, a triol, and mixtures thereof,
wherein the total hydroxyl equivalents of said (1) and said (2) fall within a range of from about 0.2 to about 0.50 equivalent per equivalent of said 4,4'-methylenebis(phenyl isocyanate); and
(b) from about 85 to about 70 percent by weight of a liquid carbodiimide-containing methylenebis(phenyl isocyanate) having an isocyanate equivalent weight of from about 140 to about 150,
provided the proportions of said prepolymer (a) and said liquid carbodiimide-containing methylenebis(phenyl isocyanate) (b) while falling within the ranges set forth above are such that the isocyanate equivalent weight of said blend is from about 145 to about 200;
(B) a polypropyleneoxy-polyethyleneoxy triol having a molecular weight of about 6500;
(C) ethylene glycol; and
(D) a catalyst component comprising dibutyl tin dilaurate wherein the equivalent proportions of said polyol (B) to said extender (C) is within the range of about 1:10 to about 1:35 and the ratio of isocyanate equivalents of (A) to the total active hydrogen equivalents of said (B) and said (C) is from about 1.02 to about 1.08.

13. A polyurethane according to claim 12 wherein said polyol component (a2) is tripropylene glycol.

14. A polyurethane according to claim 12 wherein said polyol component (a2) is trimethylolpropane.

15. A polyurethane polymer according to claim 1 prepared by the reaction injection molding method.

16. An isocyanate composition comprising a blend of
(a) a liquid isocyanate terminated prepolymer having an isocyanate equivalent weight of from about 150 to about 600 and comprising the reaction product of methylenebis(phenyl isocyanate) with a polyol mixture comprising:
(1) from about 15 to about 70 percent by weight of a polyol having a functionality of from about two to about three and a molecular weight of at least 1000, and
(2) from about 85 to about 30 percent by weight of a polyol having a molecular weight falling within a range of from about 115 to about 300 selected from the group consisting of a diol, a triol, and mixtures thereof,
wherein the total hydroxyl equivalents of said (1) and said (2) fall within a range of from about 0.10 to about 0.65 equivalent per equivalent of said methylenebis(phenyl isocyanate); and
(b) a liquefied methylenebis(phenyl isocyanate).

17. A composition according to claim 16 comprising from about 10 to about 50 percent by weight of said prepolymer (a) and from about 90 to about 50 percent by weight of said liquefied methylenebis(phenyl isocyanate) (b) provided the proportions of said (a) and said (b) while falling within the ranges set forth above are such that the isocyanate equivalent weight of said composition is from about 145 to about 200.

18. A composition according to claim 16 wherein said polyol (a1) has a functionality of about 2 and a molecular weight of from about 1500 to about 4000.

19. A composition according to claim 16 wherein said polyol (a2) is a diol.

20. A composition according to claim 16 wherein said polyol (a2) is a triol.

21. A composition according to claim 16 wherein said liquefied methylenebis(phenyl isocyanate) is a liquid carbodiimide-containing methylenebis(phenyl isocyanate) having an isocyanate equivalent weight of from about 130 to about 180.

22. An isocyanate composition comprising a blend of,
(a) from about 10 to about 30 percent by weight of a liquid isocyanate terminated prepolymer having an isocyanate equivalent weight of from about 200 to about 400 comprising the reaction product of 4,4'-methylenebis(phenyl isocyanate) with a polyol mixture comprising:
(1) from about 15 to about 70 percent by weight of a polyol having a functionality of about 2 and a molecular weight of from about 1500 to about 4000; and
(2) from about 85 to 30 percent by weight of a polyol having a molecular weight falling within a range of from about 115 to about 300 selected from the group consisting of a diol, a triol, and mixtures thereof,
wherein the total hydroxyl equivalents of said (1) and said (2) fall within a range of from about 0.2 to about 0.5 equivalent per equivalent of said methylenebis(phenyl isocyanate); and
(b) from about 90 to about 70 percent by weight of a liquid carbodiimide-containing methylenebis(phenyl isocyanate) having an isocyanate equivalent weight of from about 130 to about 180,
provided the proportions of said prepolymer (a) and said liquefied carbodiimide-containing methylenebis(phenyl isocyanate) (b) while falling within the ranges set forth above are such that the isocyanate equivalent weight of said blend is from about 145 to about 200.

23. A composition according to claim 22 wherein said polyol (a2) is a diol.

24. A composition according to claim 22 wherein said polyol (a2) is a triol.

25. A composition according to claim 22 wherein said polyol (a2) is tripropylene glycol.

26. A composition according to claim 22 wherein said polyol (a2) is trimethylolpropane.

27. A composition according to claim 25 or 26 wherein said polyol (a1) is a polyalkyleneoxy glycol having a molecular weight of from about 1500 to about 2500 and said liquid carbodiimide-containing methylenebis(phenyl isocyanate) has an isocyanate equivalent weight of from about 140 to about 150.

* * * * *

UNITED STATES PATENT OFFICE
CERTIFICATE OF CORRECTION

Patent No. 4,321,333            Dated March 23, 1982

Inventor(s) Louis M. Alberino and Robert J. Lockwood

It is certified that error appears in the above-identified patent and that said Letters Patent are hereby corrected as shown below:

Column 1, line 38 "1,557,767" should read --1,577,767--.
Column 2, line 43 "isycyanate" should read --isocyanate--.
Column 7, line 65 "strenghth" should read --strength--.
Column 11, line 48 "adequate good" should read --adequate to good--. Column 12, Table III, Isocyanate I, Sample 16 "201.75" should read --201.84--. Column 17, Table VI, line 34, 200-210 °F* incorrectly placed in Table VI; should be on same line with 150-160°F under Formulation B.

*Signed and Sealed this*

*Sixth* Day of *July 1982*

[SEAL]

Attest:

Attesting Officer

GERALD J. MOSSINGHOFF

Commissioner of Patents and Trademarks